(12) United States Patent  
Krishna et al.

(10) Patent No.: US 6,515,240 B1
(45) Date of Patent: Feb. 4, 2003

(54) COMPACT HEADLAMP/FOGLAMP SWITCH

(75) Inventors: Arul S. Krishna, Farmington Hills, MI (US); Hikita Shinichi, Niwa Gun (JP)

(73) Assignee: TRAM, Inc., Plymouth, MI (US)

( * ) Notice: Subject to any disclaimer, the term of this patent is extended or adjusted under 35 U.S.C. 154(b) by 36 days.

(21) Appl. No.: 09/614,533

(22) Filed: Jul. 11, 2000

Related U.S. Application Data

(60) Provisional application No. 60/143,563, filed on Jul. 13, 1999.

(51) Int. Cl.⁷ .................................................. H01H 9/00
(52) U.S. Cl. ............................ 200/5 R; 200/4; 200/310
(58) Field of Search ........................... 200/4, 5 R, 11 R, 200/11 A, 11 D, 11 G, 11 J, 17 R, 18, 61.54, 566, 564, 329, 336

(56) References Cited

U.S. PATENT DOCUMENTS

| | | | |
|---|---|---|---|
| 5,272,290 A | * 12/1993 | Suzuki | 200/4 |
| 5,359,165 A | * 10/1994 | Leveque et al. | 200/317 |
| 5,736,696 A | * 4/1998 | Del Rosso | 200/5 R |
| 6,281,453 B1 | * 8/2001 | Uleski | 200/4 |

* cited by examiner

Primary Examiner—Michael Friedhofer
(74) Attorney, Agent, or Firm—Raphael A. Monsanto; Benita J. Rohm

(57) ABSTRACT

A switch for controlling delivery of electrical power to a plurality of vehicle lighting systems, such as headlamps and parking lamps, as well as specialized vehicle lighting systems, such as a fog lamps, and one or more automatic mode settings. The switch has a first circuit contact system for controlling delivery of electrical energy to one or more combinations of the vehicle lighting systems. A second circuit contact controls delivery of electrical energy to the specialized vehicle lighting system. Manipulation of a switch control selects the control states of the first and second circuit contact systems. The first circuit contact system is urged in a rotational direction of travel, as the second circuit contact system is urged in an axial direction of travel. A control state limiter is provided to limit the second circuit contact system to the first control state when the first circuit contact system is in a predetermined one of the plurality of corresponding the selectable control states. Thus, for example, the vehicle's fog lamps, cannot remain "on" when the headlamps and parking lamps have been turned "off."

24 Claims, 16 Drawing Sheets

Logic Table

| Terminal / Function | 8 | 7 | 4 | 9 | 5 | 10 | 6 |
|---|---|---|---|---|---|---|---|
| AUTO2 | o—|—o | | (PULL) | | | o |
| ↕ | o—|—o—|—o | | (PULL) | | o |
| AUTO1 | o | | o | | (PULL) | | o |
| ↕ | o | | o—|—o | | | |
| OFF | o | | | o | | | |
| ↕ | o | | | o—|—o | | |
| PARK | o | | | | o | (PULL) | o |
| ↕ | o | | | | o—|—o(PULL)—|—o |
| L.BEAM | o | | | | o—|—o(PULL)—|—o |
| FOG | o | | | (PULL) | | | o |

COMPACT HEADLAMP/FOGLAMP SWITCH

RELATIONSHIP TO OTHER APPLICATION(S)

This application is continuation-in-part, and claims the benefit of the filing date, of Provisional Application for Letters Patent No. 60/143,563, filed on Jul. 13, 1999.

BACKGROUND OF THE INVENTION

1. Field of the Invention

This inventions relates generally to switches for electric lighting systems in vehicles, and more particularly, to a switch that controls headlamps and fog lamps of a vehicle, with one or more automatic mode settings.

2. Description of the Related Art

Current automotive styling trends toward decreasing vehicle size while increasing useable space in the passenger compartment have resulted in reduction of the available space behind the instrument panel. A further trend in modern vehicle design, however, is to increase the complexity of vehicle lighting packages by including, for example, fog lamps, driving lamps, daytime running lamps, and the like, as well as automatic modes of operation, such as variable or fixed shut-off delay periods. There is, therefore, a need for a vehicle lighting control switch that provides to the operator a simple arrangement by which headlamps, fog lamps, parking lights, running lights, and automatic on-off modes of operation can be controlled.

In addition to the foregoing, the prior art has not been able to achieve adequate compactness in view of the desired functionality. More specifically, there is a need for a compact switching arrangement that controls the headlamps and parking lights of a vehicle, provides for multiple automatic on-off modes of headlamp operation, and permits complete control over fog lamp operation while achieving preclusion of leaving the fog lamps in the "on" condition when the head lamp switch is placed in the "off" position.

One of the areas that contributes significantly to the bulkiness of conventional lighting switches is the translucent lighting bezel and the associated elements that propagate illumination light from a light source of the switch itself to a plurality of graphics on the instrument panel that identify the various positions of the lighting switch. In a known arrangement, a light guide is arranged to receive light from a source, the source light being propagated to graphical elements deposited on a sheet that overlies the switch and which is visible by the operator. This known arrangement results in reduced transmission of light through the graphic, which generally is light transmissive. Further, known arrangements are expensive to manufacture as the light guide is produced as a separate component from an applique on which the graphic is printed.

SUMMARY OF THE INVENTION

OBJECTS

It is, therefore, an object of this invention to provide a compact switch that can be operated to control the headlamps, fog lamps, and parking lights of a vehicle, as well as at least one automatic mode of operation.

It is another object of this invention to provide a vehicle lighting switch that prevents the vehicle fog lamps from remaining illuminated when the switch is in the "off" position.

It is also an object of this invention to provide an electric switch for the lighting of vehicle wherein the added functionality of fog lamp control does not add any significant bulk to the electric switch.

It is a further object of this invention to provide a light transmissive bezel arrangement that illuminates appropriate graphic symbols that are visible to the operator without increasing the bulk of the switch.

It is additionally an object of this invention to provide a light transmissive bezel arrangement that distributes a high proportion of received light to predetermined portions of a graphical display region.

It is yet another object of this invention to provide a light transmissive bezel arrangement that is easy and inexpensive to manufacture.

It is a still further object of the invention to provide an electric switch arrangement for the lighting system of vehicle a wherein there is provided an indication whether the fog lamp of the vehicle has been activated.

SUMMARY

The foregoing and other objects are achieved by this invention which provides, in accordance with a first apparatus aspect thereof, a vehicle switch arrangement for controlling delivery of electrical power to a plurality of vehicle lighting systems. In accordance with the invention, a first circuit contact system having a plurality of selectable control states is arranged to control delivery of electrical energy to corresponding ones of predetermined combinations of first and second vehicle lighting systems. A second circuit contact system having first and second selectable control states for controlling delivery of electrical energy to a specialized vehicle lighting system. There is additionally provided a manipulable switch control arrangement coupled to the first and second circuit contact systems for selecting the control states of the first and second circuit contact systems, the first circuit contact system being urged in a first direction of travel into the selectable control states, and the second circuit contact system being urged in a second direction of travel into the corresponding first and second selectable control states. A control state limiter arrangement limits the second circuit contact system to the first control state when the first circuit contact system is in a predetermined one of the plurality of corresponding selectable control states.

In one embodiment of the invention, the first direction of travel is rotational, and the second direction of travel is axial. The control state limiter arrangement comprises a cam that is positioned in predetermined relation to the predetermined one of the plurality of corresponding selectable control states of the first circuit contact system. In a highly practicable embodiment, the first control state of the second circuit contact system and the predetermined one of the plurality of corresponding selectable control states of the first circuit contact system correspond to respective "off" conditions for the correspondingly associated first and second vehicle lighting systems and the specialized vehicle lighting system. Such is particularly useful in an embodiment of the invention wherein the specialized vehicle lighting system is a vehicle fog lamp system.

In a further embodiment, there is provided an illuminated indicator system for providing visual indication of the selectable control states of the first circuit contact system. There additionally is provided a manipulation portion coupled to the manipulable switch control arrangement for facilitating operation of the vehicle switch arrangement by an operator. The illuminated indicator system is disposed intermediate of the manipulation portion and the manipulable switch control arrangement. In such an embodiment, a first source of illumination issues light, and is disposed so as to cause the light to be propagated through the illuminated indicator system. In a still further embodiment, there is further provided a further illuminated indicator system for providing visual indication of the selectable control states of the second circuit contact system. Thus, the present invention is particularly useful in the context of vehicle lighting systems of the type that employ fog lamp systems.

In a highly advantageous embodiment of the invention, the second circuit contact system includes a contact carrier arranged to be axially displaceable in response to the manipulable switch control arrangement and a first electrical contact element coupled to the contact carrier and arranged to be axially displaceable therewith. The contact carrier is disposed within a guideway that is useful to define the axial second direction of travel. Additionally, a second electrical contact element is coupled to the guideway for establishing an electrical connection with the first electrical contact element in response to the axial displacement of the contact carrier. A resilient biasing element is arranged within the guideway for urging the contact carrier axially within the guideway. However, an axial displacement limiter prevents the contact carrier from being expelled from the guideway in response to the urging by the resilient biasing element. In a practicable embodiment of the invention, the displacement limiter is provided with a stop protuberance extending laterally outward from a determined one of the contact carrier and the guideway. Additionally, there is provided a stop recess extending laterally inward into the other of the determined one of the contact carrier and the guideway. Preferably, the stop protuberance extends laterally outward from the contact carrier, and the stop recess is disposed in a corresponding wall of the guideway.

The first electrical contact is arranged, in a highly advantageous embodiment of the invention, to exert a resilient biasing force against the guideway in a direction that urges the stop protuberance and the stop recess into engagement. This ensures that the contact carrier will not disengage from the guideway, thereby facilitating assembly of the apparatus.

In accordance with a further apparatus aspect of the invention, there is provided a contact arrangement for an electrical switch arrangement. The contact arrangement is provided with a contact carrier that is arranged to be axially displaceable. A first electrical contact element is coupled to the contact carrier and is arranged to be axially displaceable therewith. Additionally, the guideway defines the axial second direction of travel, and a second electrical contact element is coupled to the guideway for establishing an electrical connection with the first electrical contact element in response to the axial displacement of the contact carrier.

In one embodiment that is particularly suited for controlling vehicle lighting, there is provided a rotary element for urging the contact carrier axially within the guideway. The rotary element is axially displaceable for effecting a corresponding axial displacement of the contact carrier in relation to the guideway.

In one embodiment that is particularly suited for controlling vehicle lighting, there is provided a rotatory element for urging the contact carrier axially within the guideway. The rotatory element is axially displaceable for effecting a corresponding axial displacement of the contact carrier in relation to the guideway.

In accordance with a still further apparatus aspect of the invention, there is provided a vehicle switch arrangement for controlling delivery of electrical power to a plurality of vehicle lighting systems. A first circuit contact system has a plurality of selectable control states for controlling delivery of electrical energy to corresponding ones of predetermined combinations of first and second vehicle lighting systems. A second circuit contact system is provided with first and second selectable control states for controlling delivery of electrical energy to a specialized vehicle lighting system, which may, in certain embodiments, be a vehicle fog lamp system. A switch control arrangement is coupled to the first and second circuit contact systems for selecting the control states of the first and second circuit contact systems. The first circuit contact system is urged in a first direction of travel into the selectable control states, and the second circuit contact system being urged in a second direction of travel into the corresponding first and second selectable control states. Additionally, a manipulable portion is coupled to the switch control arrangement for facilitating manipulation of the switch control arrangement by an operator. A control state limiter arrangement is provided to limit the second circuit contact system to the first control state when the first circuit contact system is in a predetermined one of the plurality of corresponding selectable control states. A first illuminated indicator system illuminates a visual indication of the selectable control states of the first circuit contact system, and a translucent light guide, that is disposed intermediate of the manipulable portion and the switch control arrangement, propagates therethrough a light issued by the first illuminated indicator system.

In one embodiment of this further aspect of the invention, there is provided a second illuminated indicator system for providing visual indication of the selectable control states of the second circuit contact system. The second illuminated indicator system issues a light that also is propagated through the translucent light guide.

In one embodiment, the first and second directions of travel are orthogonal to one another. As previously noted, a guideway limits displacement of the second circuit contact system to a predetermined axial path.

BRIEF DESCRIPTION OF THE DRAWING

Comprehension of the invention is facilitated by reading the following detailed description, in conjunction with the annexed drawing, in which:

FIG. 15 is a logic table that illustrates the various logic states of a specific illustrative embodiment;

DETAILED DESCRIPTION

Figure 1:
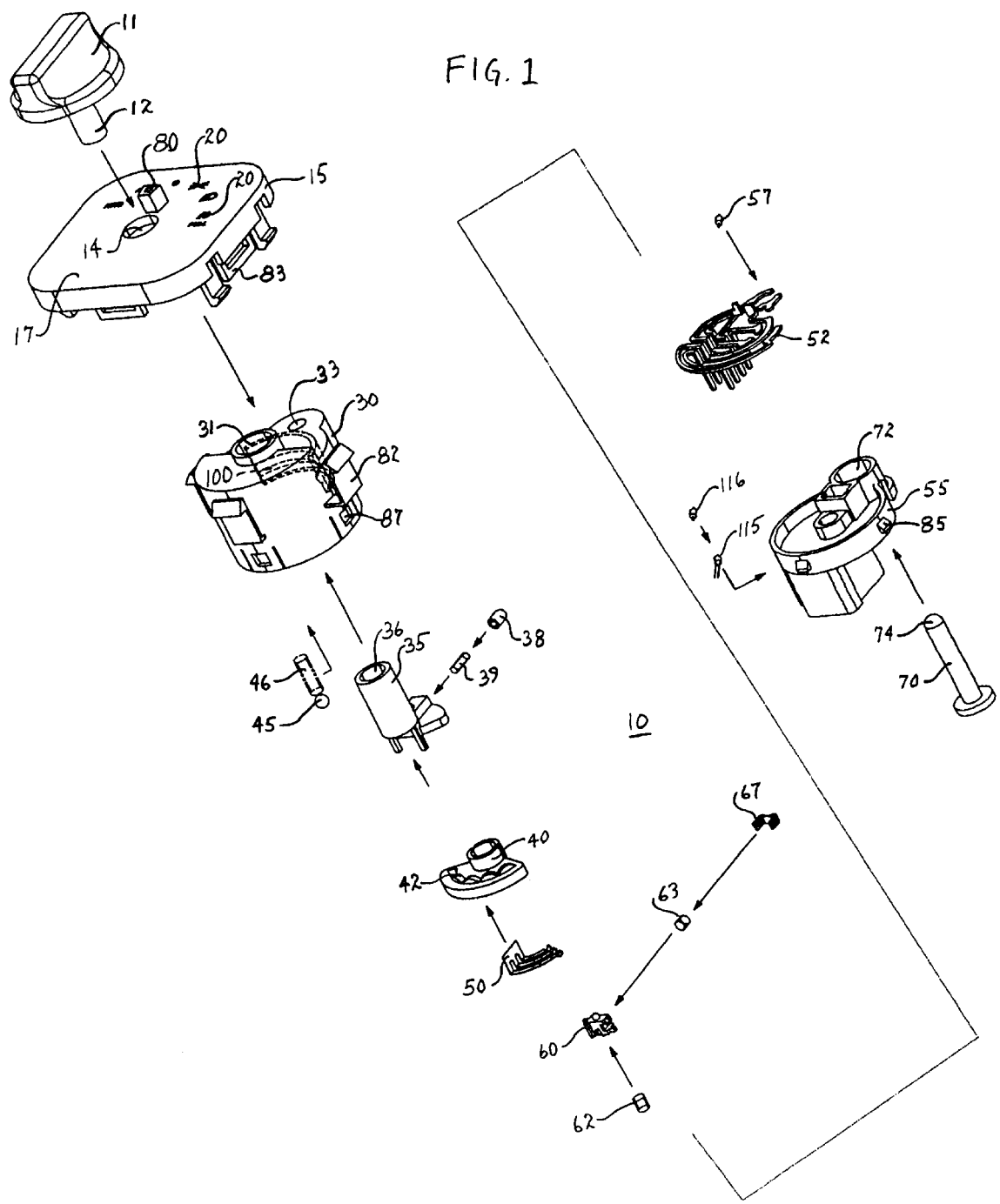
FIG. 1 is an isometric exploded representation of a specific embodiment of the invention.

FIG. 1 is an exploded isometric representation of a switch arrangement 10 constructed in accordance with the principles of the invention. As will be described, switch arrangement 10 is actuated by an operator (not shown) via a switch knob 11, which forms a manipulable portion, having an axial portion 12 that protrudes through an aperture 14 of a light-transmitting bezel 15. In this embodiment, switch knob 11 is formed, in this specific illustrative embodiment of the invention, of an acrylonitrile-butadiene styrene terpolymer (ABS) plastic. Bezel 15 is formed of polycarbonate (PC). The light-transmitting bezel has integrated therewith a light-blocking applique 17 that is provided with a plurality of translucent graphical elements 20. Thus, in this specific illustrative embodiment of the invention, the light that is propagated through light-transmitting bezel 15 is not visible to the operator via light-blocking applique 17 except at the translucent graphical elements. In this embodiment, translucent graphical elements 20 correspond to symbols for parking lamps, headlamps, fog lamps, and "off" position, and a plurality of automatic mode positions.

Switch knob 11 and light-transmitting bezel 15 are arranged to communicate with a switch body 30 such that axial portion 12 of the switch knob enters an aperture 31 in the switch body. The switch body in this embodiment, is formed of ABS. Switch body 30 is provided with an additional aperture 33 through which is accommodated a light source, as will be described below.

A first holder 35 is centrally disposed within switch body 30 and is provided with a aperture 36 therethrough that engages with axial portion 12 of switch knob 11. First holder 35 is formed of polybutylene terephthalate (PBT) and has associated therewith a detent element 38 that is urged radially outward of the first holder by a resilient biasing force exerted by a spring 39.

A second holder 40 is axially engaged with first holder 35 and has integrally formed therewith a plurality of detent lobes 42 that engage axially with a detent ball 45 that is resiliently urged in the direction of detent lobes 42 by operation of a spring 46. In this embodiment, second holder 40 is formed of PBT. A contact 50 formed of silver-plated BeCu is fixedly coupled to second holder 40 so as to be rotatable therewith. Contact 50 communicates electrically with an electrical terminal arrangement 52 that is arranged in insulator 55. In addition, a carbon resistor 57 communicates electrically with electrical terminal arrangement 52, as shown.

Interposed between insulator 55 and second holder 40 is a third holder 60 that is urged axially toward second holder 40 by operation of a compression spring 62. The compression spring provides a resilient bias force against a force that would be transferred to third holder 60 by first holder 35, which is coupled to switch knob 11. Third holder 60 is shown to have a compression spring 63 extending radially (laterally) therefrom so as to urge a contact 67 in a radially outward direction. Light-transmitting bezel 15 receives its light from a light source 70. As shown, light source 70 is arranged to extend through aperture 72 of insulator 75 so as to have its light-emitting end 74 be disposed proximal to the underside (not shown) of the light-transmitting bezel.

In this specific embodiment, switch knob 11 is partially hollow (not shown) so as to accommodate therewithin a bezel stop 80 on light-transmitting bezel 15. The interior portion of switch block 11 is configured to communicate against bezel stop 80 so as to preclude rotatory travel beyond predetermined angular displacement.

Figure 2:
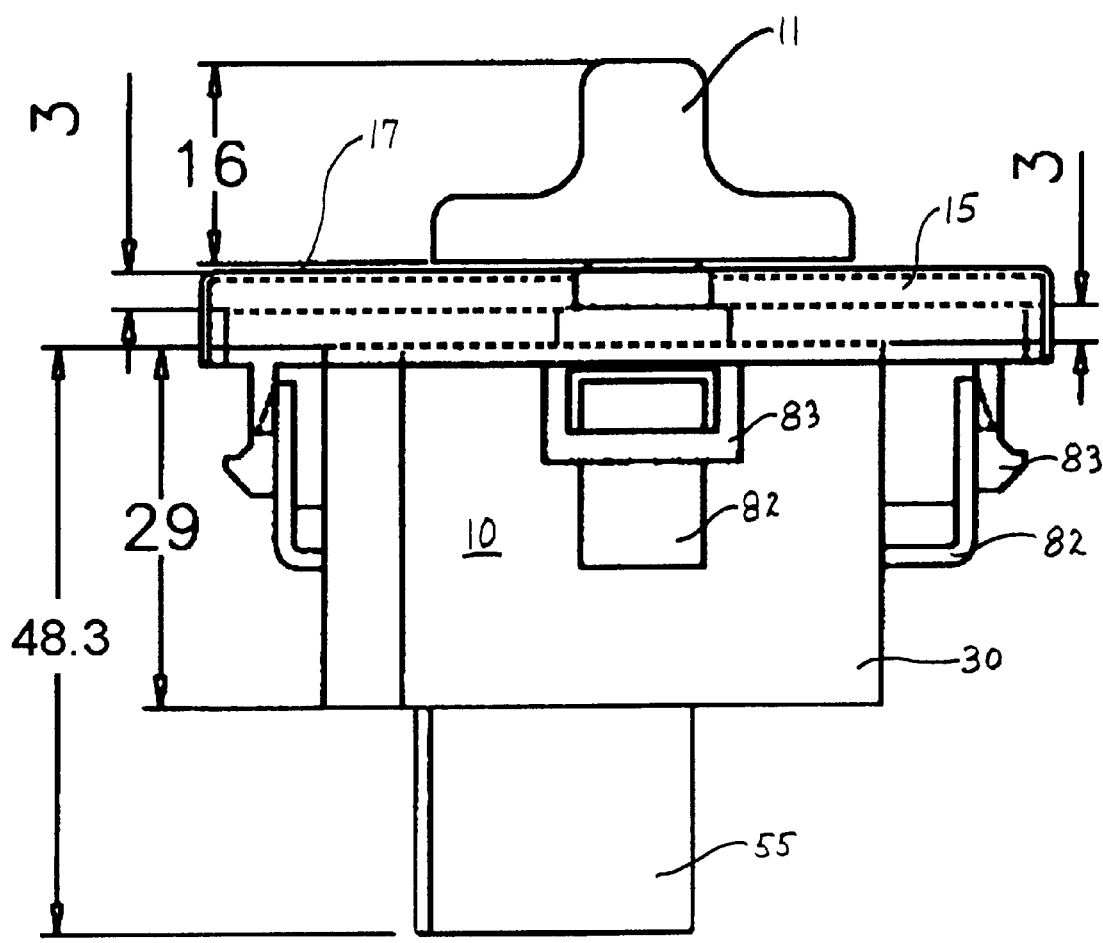
FIG. 2 is a side view of the embodiment of FIG. 1.

FIG. 2 is a side view of the embodiment of FIG. 1. Elements of structure that previously have been discussed are similarly designated. FIG. 1 additionally shows certain illustrative dimensions of switch arrangement 10. For example, switch knob 11 has an axial dimension of 16 mm in this specific illustrative embodiment. Switch body 30 has an axial dimension of 29 mm in this embodiment, while the switch body in combination with insulator 55 has an axial dimension of 48.3 mm. The figure additionally shows that light-transmitting bezel 15 is molded to have a front surface thickness of approximately 3 mm, the overall height of the bezel above the switch being approximately 6 mm.

FIG. 2 additionally shows that light-transmitting bezel 15 and switch body 30 engage with one another by means of resilient engaging elements 82 and 83. Referring for the moment to FIG. 1, it is seen that latching elements 85 on insulator 55 engage with corresponding square-shaped apertures on switch body 30.

FIG. 2 additionally shows light-blocking applique 17 to be integrally molded with lighttransmitting bezel 15. The applique may, for example, be subjected to ink transfer, silk screening, or any other suitable process for applying the graphic thereon, and may by molded into the light transmitting bezel. This enables precise placement of the light-blocking applique such that efficient transmission of light through the bezel is achieved.

Figure 3:
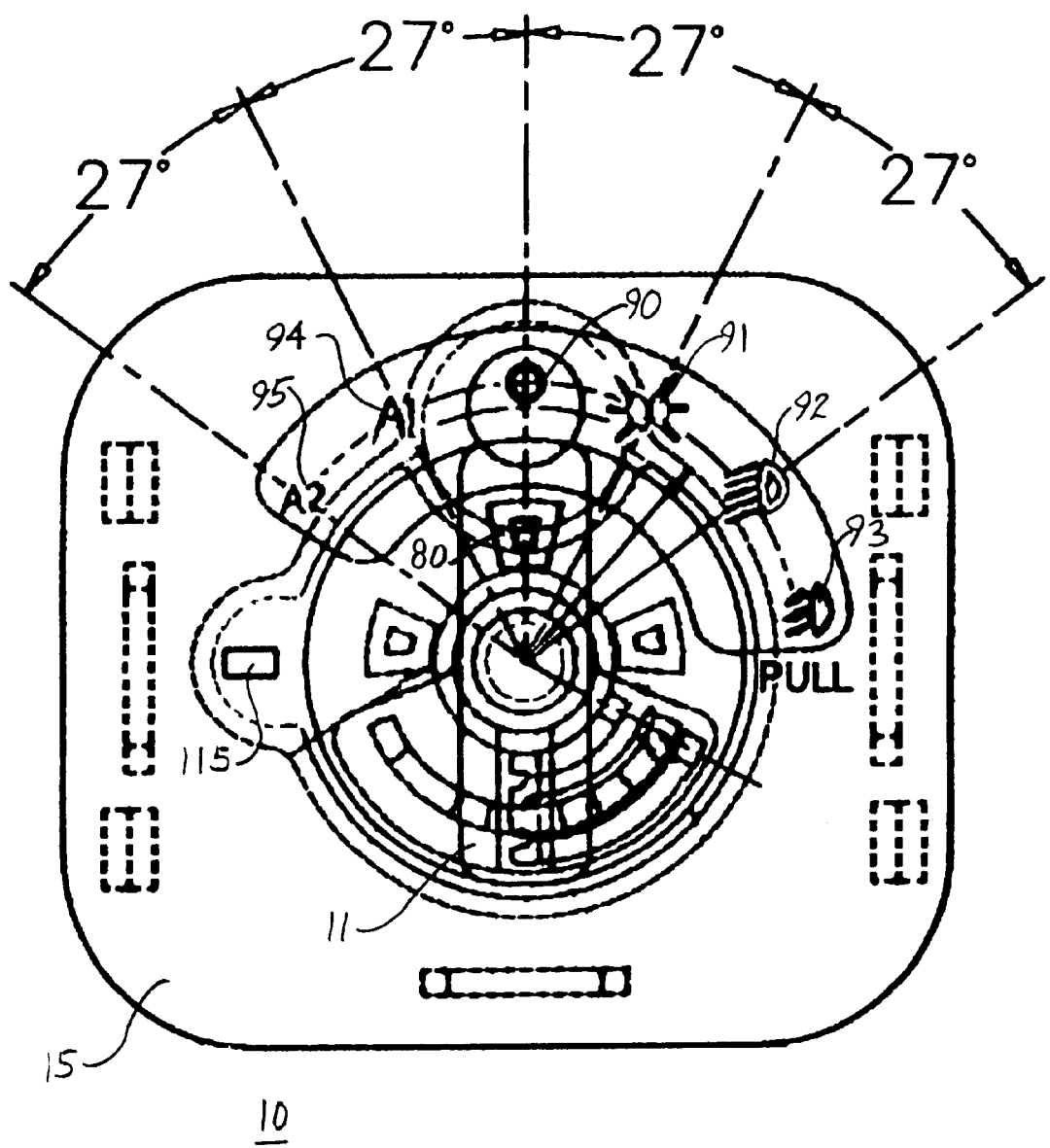
FIG. 3 is a partially phantom schematic representation of the front surface of a switch arrangement in accordance with the present invention.

FIG. 3 is a partially phantom schematic representation of the front surface of switch arrangement 10 showing switch knob 11 pointing to "off" position 90. The figure additionally shows that the knob can be manipulated to a parking light position 91, a headlamp position 92, a fog lamp position 93 (where the knob must be pulled), a first automatic position 94 and a second automatic position 95. Switch knob 11 is shown overlying bezel stop 80 which, as previously indicated, limits the extent of angular rotation of the switch knob. When the fog lamp is activated by pulling switch knob 11, an LED 115 is illuminated, as will be described below.

In this specific illustrative embodiment of the invention, each of the possible knob positions is angularly distanced by 27° relative to each other.

Figure 4:
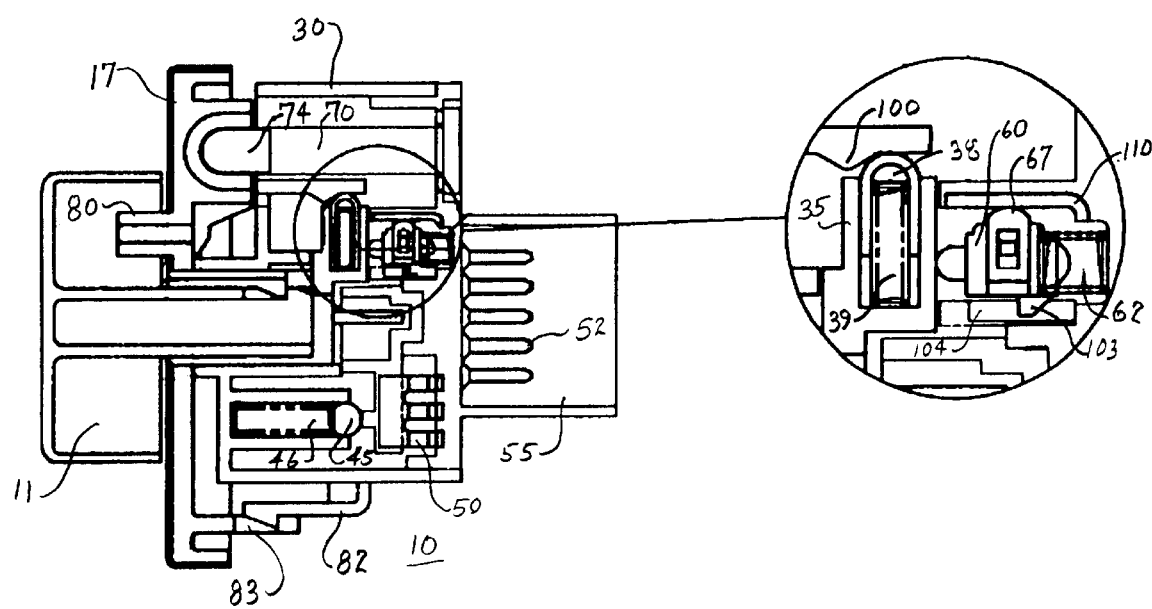
FIG. 4 is a partially fragmented representation of the switch arrangement of FIG. 3 in assembled condition.

FIG. 4 is a partially fragmented representation of switch arrangement 10 in assembled condition. Elements of structure that previously have been described are similarly designated. In addition, this figure shows a radially extending arrangement that facilitates the turning on of the fog lamps in response to the pulling of switch knob 11. The electrical contact arrangement for actuating the fog lamp (not shown)

is shown in greater detail in the magnified portion of FIG. 4. As shown, third holder 60 (see, also FIG. 1) is urged against first holder 35 by operation of spring 62 when switch knob 11 is in the inserted position, as shown. In this condition, detent element 38 is disposed on the right hand side of internal circumferential protuberance 100 that is formed on the circumferential inner surface of switch body 30 (shown in phantom in FIG. 1). However, when switch knob 11 is pulled toward the left in this figure, detent element 38 is drawn to the other side of circumferential protuberance 100, thereby permitting third holder 60 to be urged toward the left hand side by spring 62 along track 104 that is shown to be engaged with engagement element 103. In this pulled condition, third holder 60 with contact 67 causes the fog lamp circuit, via a stationary contact 110, to close, whereupon the fog lamp is illuminated and a corresponding indication is produced, as will be described hereinbelow with respect to FIGS. 14 and 15.

Irrespective of the rotational or axial position of switch knob 11, second holder 40, and contact 50 attached thereto, continue to be urged toward electrical terminal arrangement 52, thereby maintaining electrical communication between the electrical terminal arrangement and contact 50. Thus, switch arrangement 10 will continue to perform the functions indicated at any of the rotary positions mentioned hereinabove in connection with FIG. 3, irrespective of whether knob 11 is pulled out or pushed in.

Figure 5:
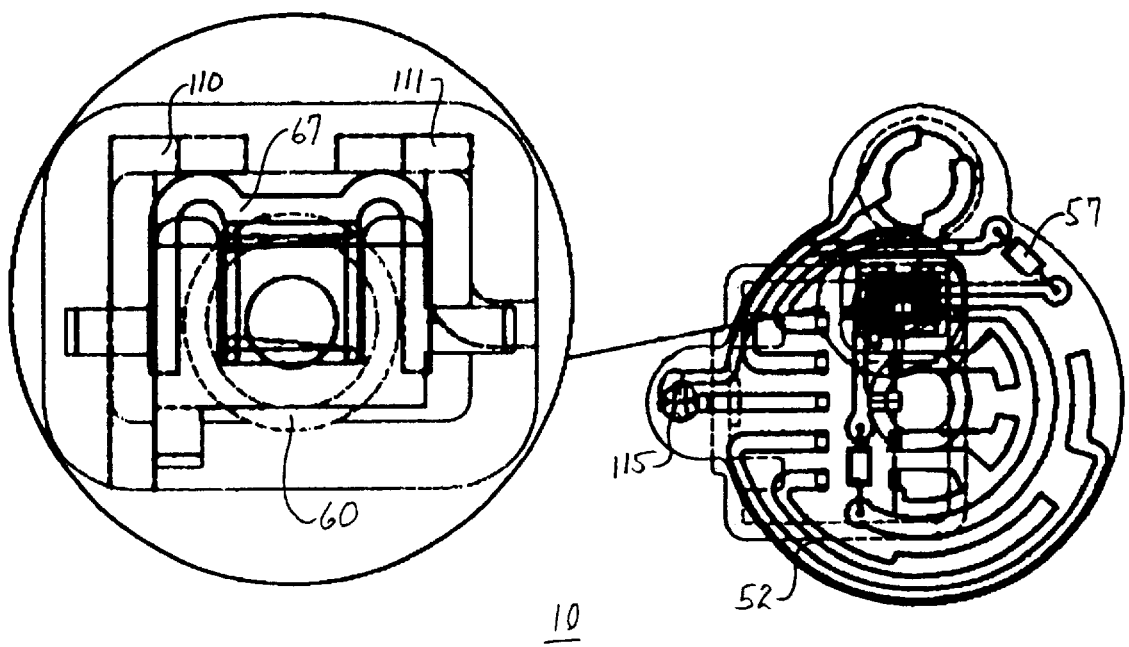
FIG. 5 is a schematic representation of the switch arrangement of the present invention, further showing an enlarged view of a selected portion.

FIG. 5 is a schematic representation of switch arrangement 10 showing a magnified region where contact 67 on third holder 60 makes electrical contact with terminal 110 (see, also FIG. 4) and a terminal 111 of electrical terminal arrangement 52. Elements of structure that have previously been discussed are similarly designated.

Figure 6:
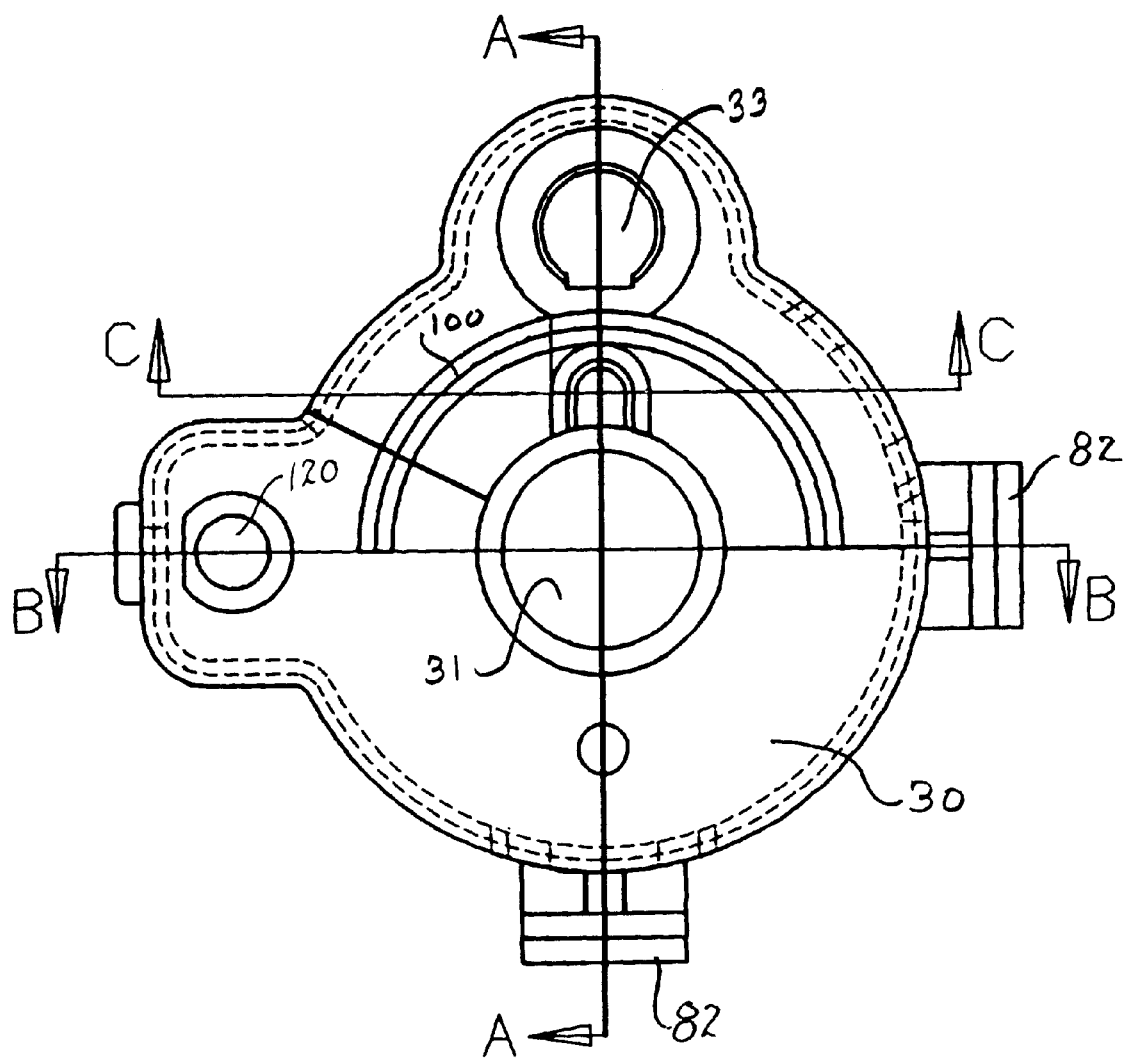
FIG. 6 is a top plan view of the switch body of the specific illustrative embodiment of the invention.

FIG. 6 is a top plan view of switch body 30 of the specific illustrative embodiment of the invention. Elements of structure that have previously been discussed are similarly designated. In this figure, a portion of the top surface of the switch body has been removed to show internal circumferential protuberance 100 that is formed on the circumferential inner surface of the switch body. The internal circumferential protuberance is shown in this figure to be substantially annular, centered about the center of aperture 31. As previously noted in connection with FIG. 1, aperture 33 receives light source 70 (not shown in this figure), its light-emitting end 74 (not shown in this figure) being proximal in the view of FIG. 6.

Figure 7:
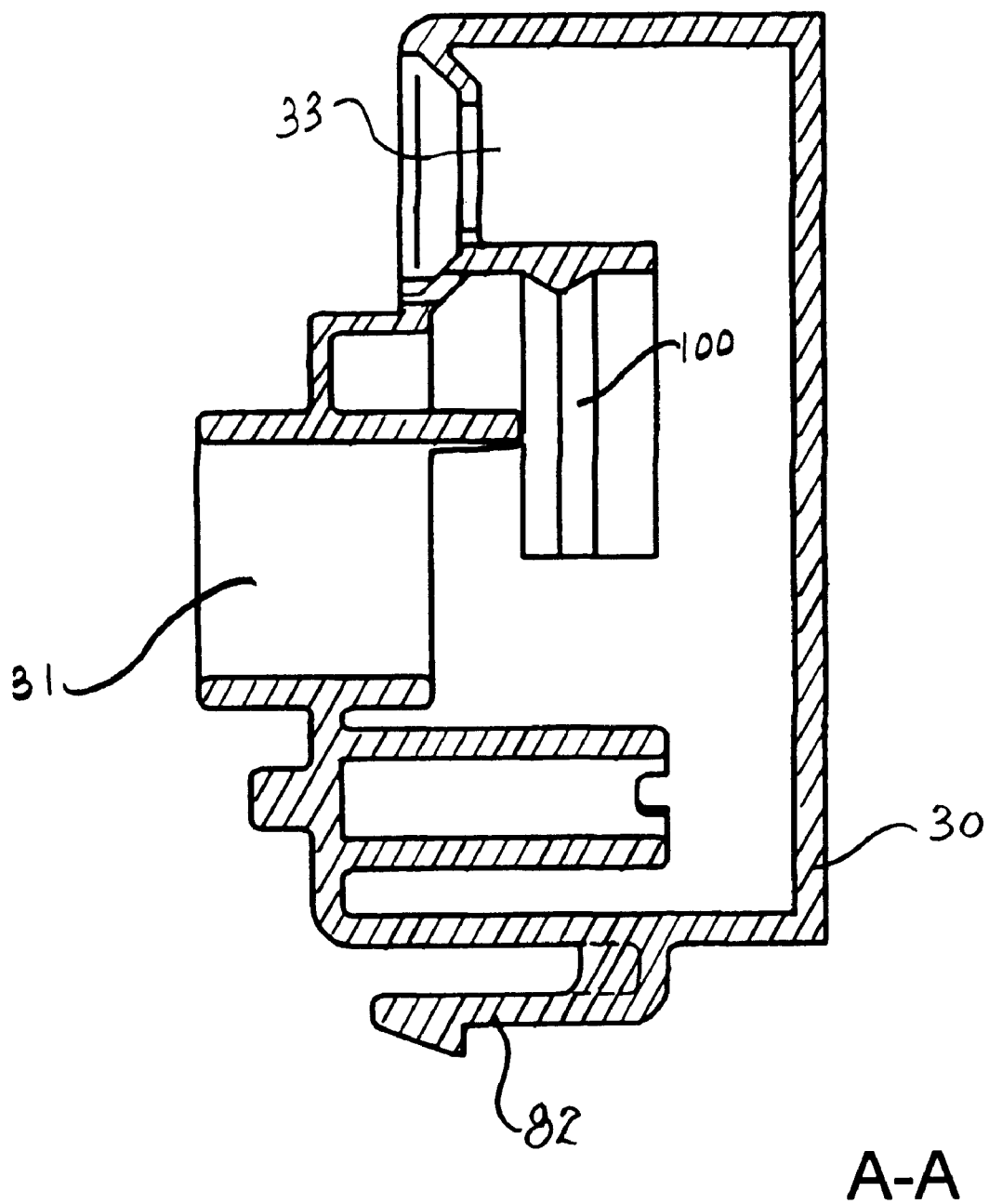
FIG. 7 is a cross-sectional representation of the embodiment of FIG. 6 taken along section line A—A.

FIG. 7 is a cross-sectional representation of the embodiment of FIG. 6 taken along section line A—A. This figure shows the relationship between apertures 31 and 33 and internal circumferential protuberance 100.

Figure 8:
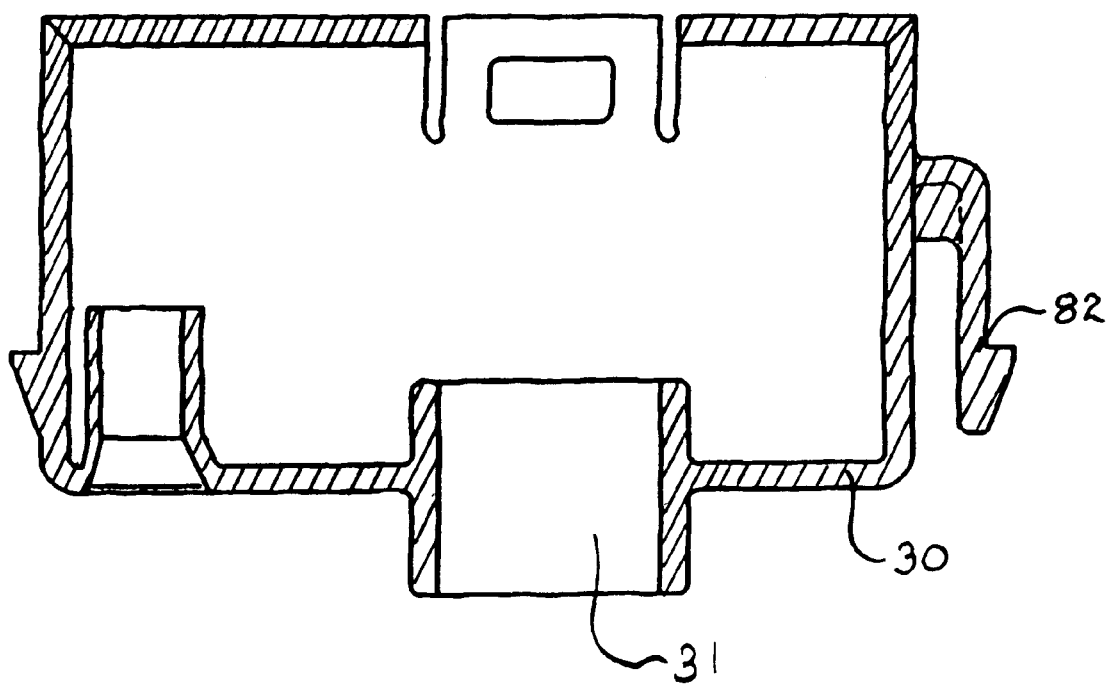
FIG. 8 is a cross-sectional representation of the embodiment of FIG. 6 taken along section line B—B.

FIG. 8 is a cross-sectional representation of the embodiment of FIG. 6 taken along section line B—B. This figure also shows the relationship between apertures 31 and 33 and internal circumferential protuberance 100. Additionally, there is shown a further aperture 120 (also shown in FIG. 6) that accommodates LED 115 (not shown in this figure).

Figure 9:
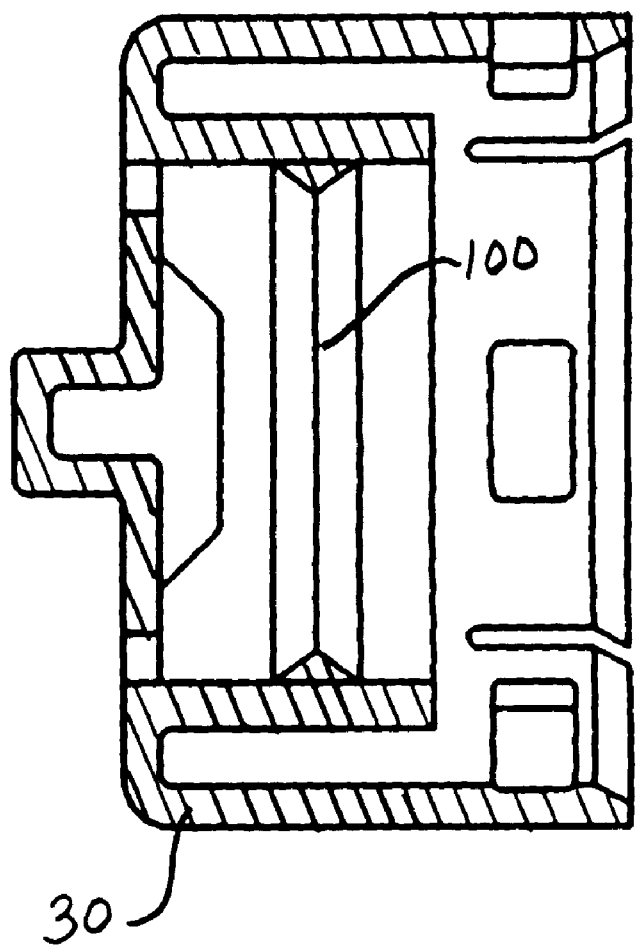
FIG. 9 is a cross-sectional representation of the embodiment of FIG. 6 taken along section line C—C.

FIG. 9 is a cross-sectional representation of the embodiment of FIG. 6 taken along section line C—C. This figure shows a larger cross-sectional view of internal circumferential protuberance 100.

Figure 10:
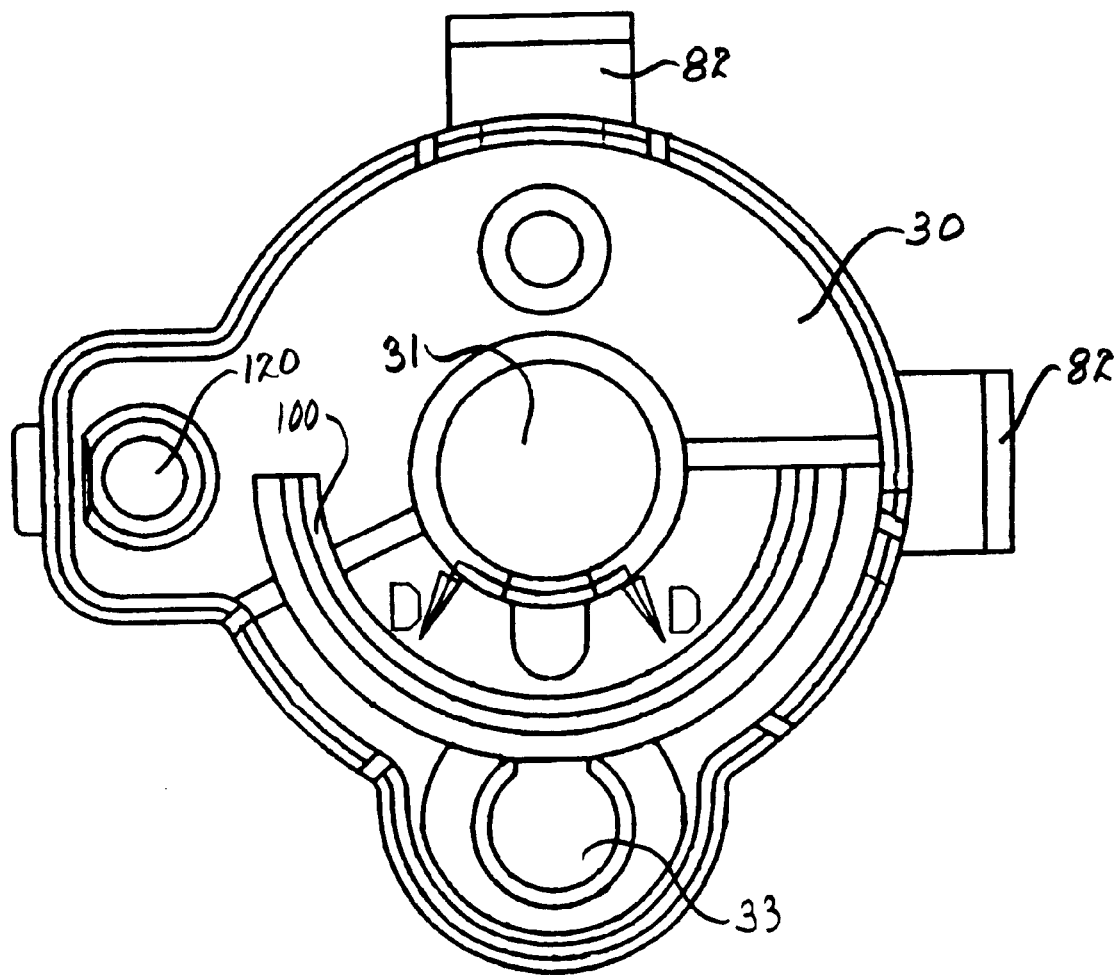
FIG. 10 is a plan representation of the underside of the specific illustrative embodiment of the invention shown in FIG. 6.

FIG. 10 is a plan representation of the underside of the specific illustrative embodiment of the invention shown in FIG. 6. In addition, this figure shows the underside of internal circumferential protuberance 100.

Figure 11:
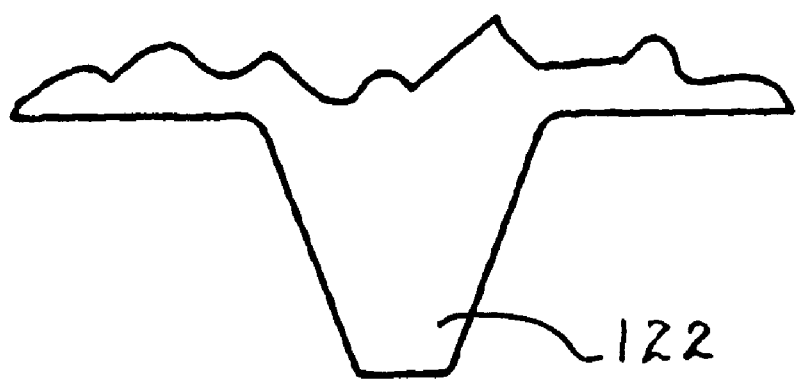
FIG. 11 is a cross-sectional representation of the embodiment of FIG. 10 taken along section line D—D.

FIG. 11 is a cross-sectional representation of the embodiment of FIG. 10 taken along section line D—D. This figure shows a partially fragmented plan view of a return lobe 122 that serves to return switch knob 11 from the pulled to the original (i.e., not pulled) position when the switch knob is rotated, in this specific illustrative embodiment of the invention, to the "off" position. This ensures that the fog lamp does not inadvertently remain activated when it is desired to deactivate all vehicle lamps.

Figure 12:
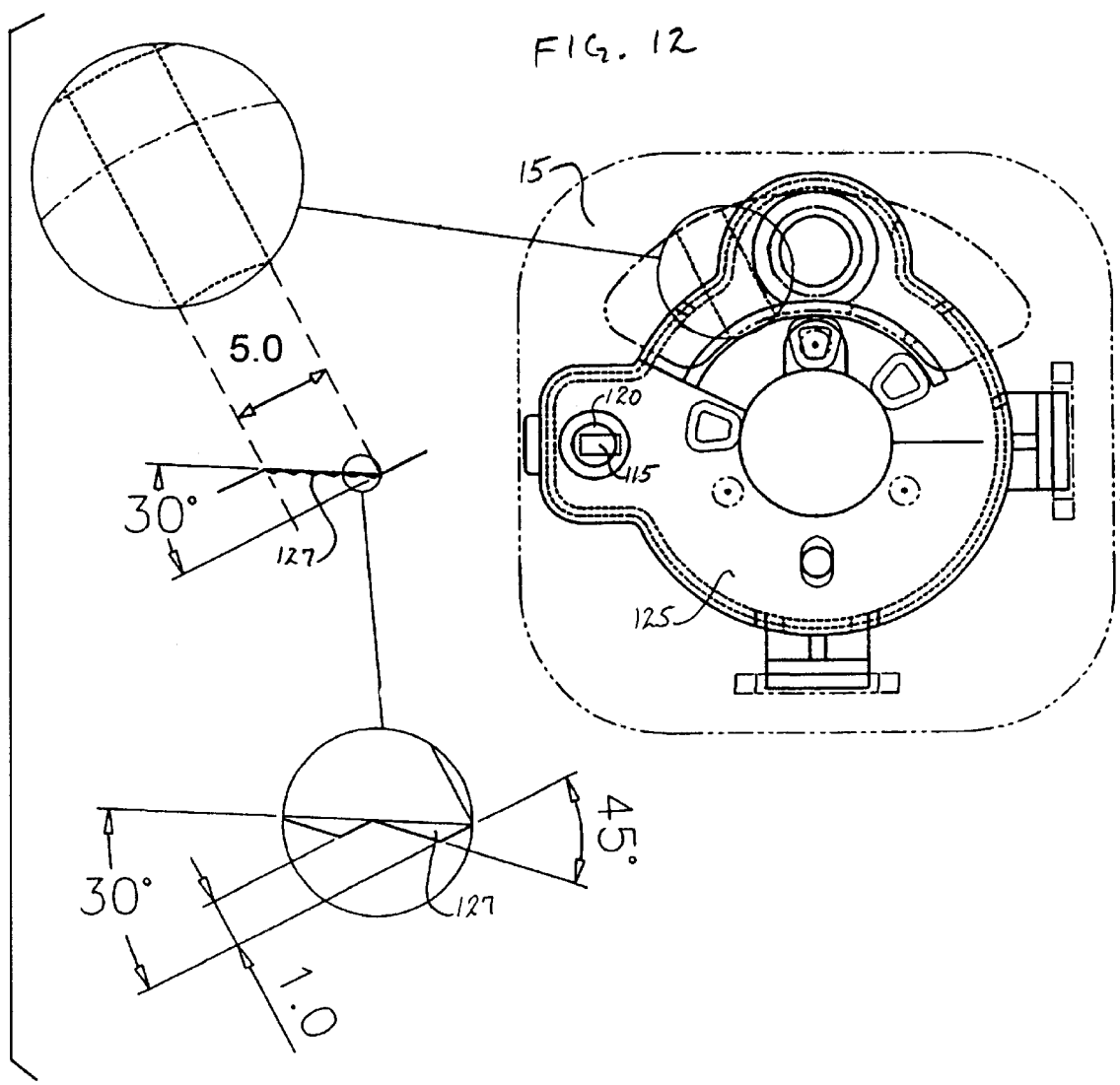
FIG. 12 is a plan representation showing the top side of the light transmitting bezel and certain details of the light transmitting light guide.

FIG. 12 is a plan representation showing the top side of light transmitting bezel 15 and certain details of a light guide 125. As shown in the enlarged detail, which corresponds to a view of approximately 5.0 mm, there are provided a plurality of protuberances 127 that function as small prisms. These prisms are shown in greater detail in the further enlarged detail view which shows that in this specific illustrative embodiment of the invention, the small prisms have a triangular configuration, the base angles therefor being 45° and 30°, respectively. These small prisms significantly enhance the portion of the light from light-emitting end 74 of light source 70 (not shown in this figure) that is delivered to translucent graphical elements 20 (not shown in this figure).

Figure 13:
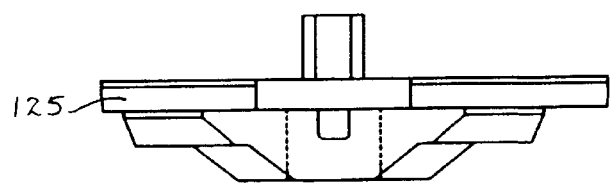
FIG. 13 is a side representation of the light transmitting light guide.

FIG. 13 is a side representation of a specific illustrative embodiment of light guide 125. This figure shows one of a variety of possible light guide configurations that can be employed in the practice of the invention.

Figure 14:
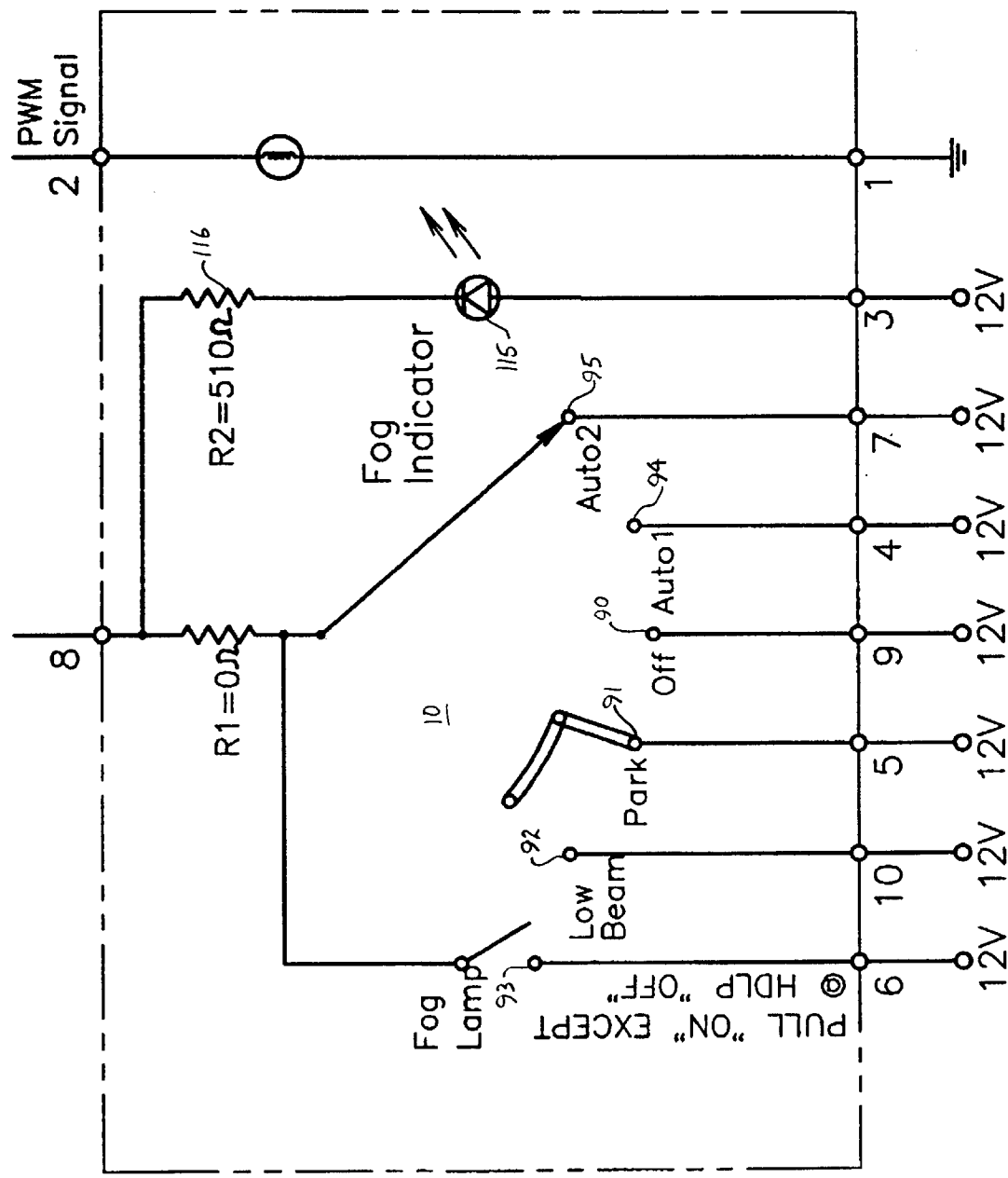
FIG. 14 is a schematic diagram showing the various positions of a switch arrangement constructed in accordance with the principles of the invention.

FIG. 14 is a schematic diagram showing the various positions of a switch arrangement constructed in accordance with the principles of the invention. Terminals 1 through 10 are coupled to electrical terminal arrangement 52, as previously described, and ultimately are connected to an electronic module (not shown) that supplies electrical energy to the various lamps (not shown). The figure shows a fog indicator LED 115, the current through which is limited by a resistor 116. Both of these elements of structure are shown in the exploded diagram of FIG. 1 and the function of the LED is further described in connection with FIG. 15.

FIG. 15 is logic table that illustrates the various logic states of the specific illustrative embodiment described herein. In this table, the various functional states are correlated to terminals, as represented hereinabove with respect to FIG. 14. Fog indicating LED 115 is shown in both figures as not being energized by electrical interconnection within switch arrangement 10, but instead receives a signal from the electronic module (not shown) that indicates that the fog lamp has been energized. Thus, LED 115 provides a true indication of whether the fog lamp has been activated.

Figure 16:
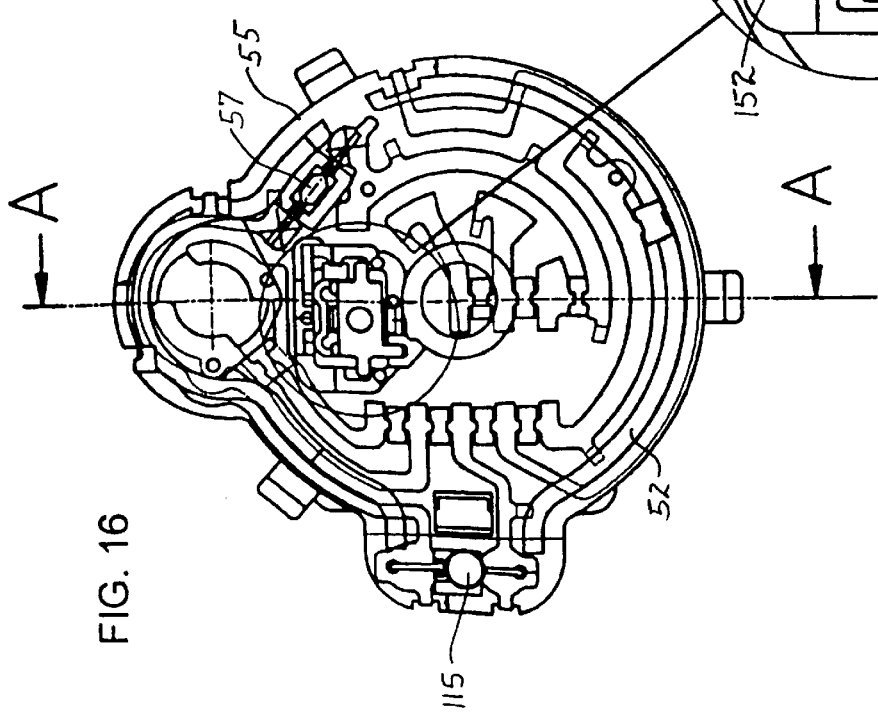
FIG. 16 is a schematic representation of a further embodiment of the switch arrangement of the present invention, further showing an enlarged view of a selected portion.

FIG. 16 is a schematic representation of a further embodiment of the switch arrangement of the present invention, further showing an enlarged view of a selected portion. Elements of structure that are analogous to elements described hereinabove are similarly designated.

Figure 17:
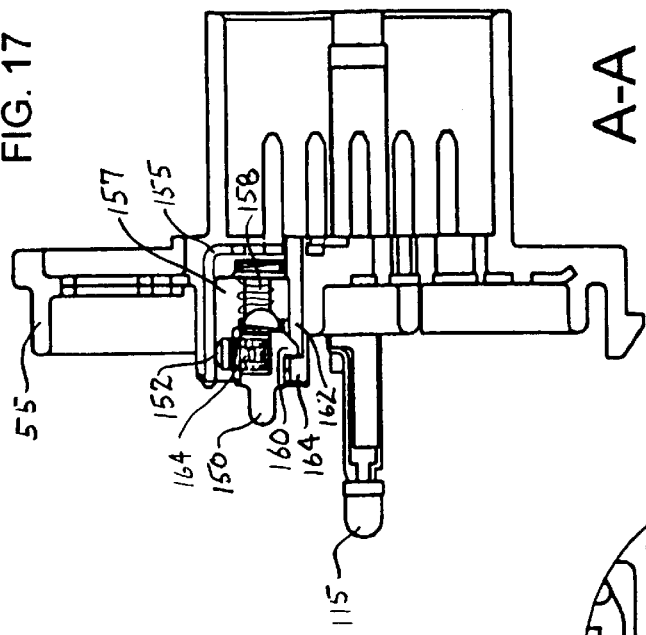
FIG. 17 is a cross-sectional representation of the embodiment of FIG. 16, taken along section A—A.

FIG. 17 is a cross-sectional representation of the embodiment of FIG. 16, taken along section A—A. As shown in the enlargement in FIG. 16, a contact carrier 150 (which is functionally similar to third holder 60 in FIG. 1) has coupled thereto a electrical contact 152. In a vehicle lamp switch embodiment of the invention, electrical contact 152 controls the flow of electrical energy to the vehicle's fog lamps (not shown in this figure). Referring to FIGS. 16 and 17, it is seen that contact carrier 150 is disposed within a guideway 155 that has an internal volume 157 that accommodates the-contact carrier. The contact carrier is displaceable axially along the interior of guideway 155. However, it is urged outward of the guideway (i.e., toward the left in FIG. 17) by a resilient biasing element in the form of a spring 158.

Displacement of contact carrier 150 is limited to preclude the contact carrier from being expelled from the guideway by a limiter arrangement. In this specific illustrative embodiment of the invention, contact carrier 150 is provided with a protuberance 160 that engages with an elongated recess 162 in the interior wall of guideway 155. Engagement between protuberance 160 and recess 162 is maintained by the application of a resilient biasing force from a spring 164 which is interposed between contact carrier 150 and electrical contact 152. In operation, the force that is applied by electrical contact 152 against the internal wall of guideway 155 urges the protuberance and the recess into engagement, whereby outward displacement of contact carrier 150 is precluded when the protuberance is urged against a stop 164.

Figure 18:
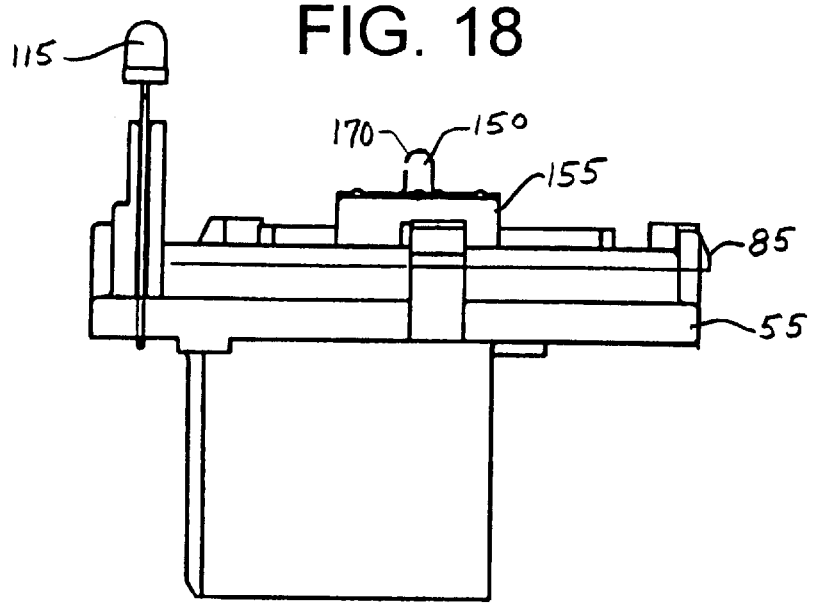
FIG. 18 is a side view of the embodiment of FIG. 16, as seen from the bottom of that figure.
Figure 19:
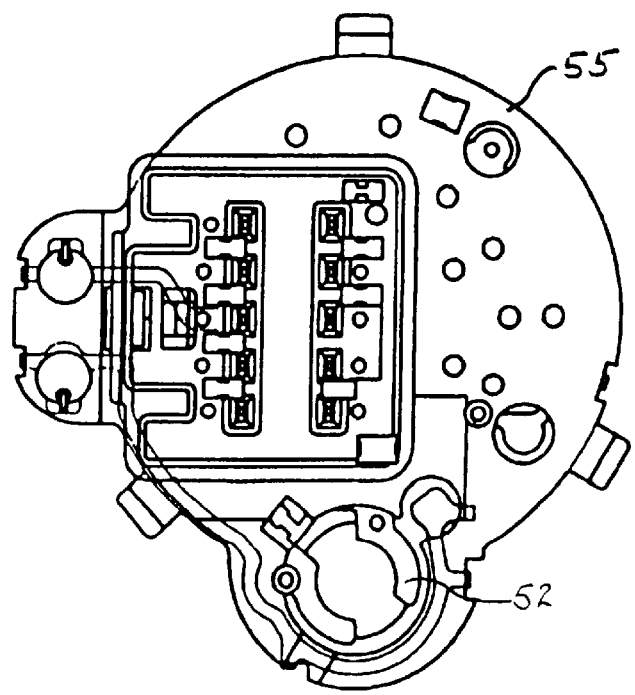
FIG. 19 is a plan view of the embodiment of FIG. 16, as seen from the rear of that figure.

FIG. 18 is a side view of the embodiment of FIG. 16, as seen from the bottom of that figure, and FIG. 19 is a plan view of the embodiment of FIG. 16, as seen from the rear of that figure. Elements of structure that are analogous to elements described hereinabove are similarly designated. It is seen in FIG. 18 that contact carrier 150 has an axially extended portion 170 that extends outward of guideway 155. The outermost tip of extended portion 170 communicates with third holder 35 (FIG. 1) to receive an inward axial force that corresponds to the "off" condition of the vehicle's fog lamps (not shown in this figure). FIG. 19 shows a portion of electrical terminal arrangement 52 (see, FIG. 1) that supplies electrical energy to light source 70 (not shown in this figure).

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A vehicle switch arrangement for controlling delivery of electrical power to a plurality of vehicle lighting systems, the vehicle switch arrangement comprising:
    a first circuit contact system having a plurality of selectable control states for controlling delivery of electrical energy to corresponding ones of predetermined combinations of first and second vehicle lighting systems;
    a second circuit contact system having first and second selectable control states for controlling delivery of electrical energy to a specialized vehicle lighting system;
    a manipulable switch control arrangement coupled to said first and second circuit contact systems for selecting the control states of said first and second circuit contact systems, said first circuit contact system being urged in a rotational direction of travel into the selectable control states, and said second circuit contact system being urged in an axial direction of travel into the corresponding first and second selectable control states;
    a control state limiter arrangement for limiting said second circuit contact system to the first control state when said first circuit contact system is in a predetermined one of the plurality of corresponding selectable control states; and
    an illuminated indicator system for providing visual indication of the selectable control states of said first circuit contact system.

2. The vehicle switch arrangement of claim 1, wherein said control state limiter arrangement comprises a cam that is positioned in predetermined relation to the predetermined one of the plurality of corresponding selectable control states of said first circuit contact system.

3. The vehicle switch arrangement of claim 1, wherein the first control state of said second circuit contact system and the predetermined one of the plurality of corresponding selectable control states of said first circuit contact system correspond to respective "off" conditions for the correspondingly associated first and second vehicle lighting systems and the specialized vehicle lighting system.

4. The vehicle switch arrangement of claim 3, wherein the specialized vehicle lighting system is a vehicle fog lamp system.

5. The vehicle switch arrangement of claim 1, wherein there is further provided a manipulation portion coupled to said manipulable switch control arrangement for facilitating operation of the vehicle switch arrangement by an operator.

6. The vehicle switch arrangement of claim 5, wherein said illuminated indicator system is disposed intermediate of said manipulation portion and said manipulable switch control arrangement.

7. The vehicle switch arrangement of claim 6, wherein there is further provided a first source of illumination for issuing light, said first source of illumination being disposed so as to cause the light to be propagated through said illuminated indicator system.

8. The vehicle switch arrangement of claim 1, wherein there is further provided a further illuminated indicator system for providing visual indication of the selectable control states of said second circuit contact system.

9. The vehicle switch arrangement of claim 1, wherein said second circuit contact system comprises:
    a contact carrier arranged to be axially displaceable in response to said manipulable switch control arrangement;
    a first electrical contact element coupled to said contact carrier and arranged to be axially displaceable therewith;
    a guideway for defining the axial direction of travel; and
    a second electrical contact element coupled to said guideway for establishing an electrical connection with said first electrical contact element in response to the axial displacement of said contact carrier.

10. The vehicle switch arrangement of claim 9, wherein there is further provided a resilient biasing element arranged within said guideway for urging said contact carrier axially within said guideway.

11. The vehicle switch arrangement of claim 10, wherein there is further provided an axial displacement limiter for preventing said contact carrier from being expelled from said guideway in response to said resilient biasing element.

12. The vehicle switch arrangement of claim 11, wherein said displacement limiter comprises a carrier stop formed of:
    a stop protuberance extending laterally outward from a determined one of the contact carrier and the guideway; and
    a stop recess extending laterally inward into the other of the determined one of the contact carrier and the guideway.

13. The vehicle switch arrangement of claim 12, wherein said first electrical contact is arranged to exert a resilient biasing force against said guideway in a direction that urges said stop protuberance and said stop recess into engagement.

14. A contact arrangement for an electrical switch arrangement, the contact arrangement comprising:
    a contact carrier arranged to be axially displaceable;
    a first electrical contact element coupled to said contact carrier and arranged to be axially displaceable therewith;

a guideway for defining the axial direction of travel;

a resilient biasing element arranged within said guideway for urging said contact carrier axially within said guideway;

a carrier stop for preventing said contact carrier from being expelled from said guideway in response to said resilient biasing element, said axial retainer comprising:

a stop protuberance extending laterally outward from a determined one of the contact carrier and the guideway; and a stop recess extending laterally inward into the other of the determined one of the contact carrier and the guideway; and a second electrical contact element coupled to said guideway for establishing an electrical connection with said first electrical contact element in response to the axial displacement of said contact carrier.

15. The contact arrangement of claim 14, wherein said first electrical contact is arranged to exert a resilient biasing force against said guideway in a direction that urges said stop protuberance and said stop recess into engagement.

16. The contact arrangement of claim 15, wherein there is further provided a contact resilient element interposed between said contact carrier and said first electrical contact element for exerting the resilient biasing force against said guideway.

17. The contact arrangement of claim 14, wherein there is further provided a rotary element for urging said contact carrier axially within said guideway.

18. The contact arrangement of claim 17, wherein said rotary element is axially displaceable for effecting a corresponding axial displacement of said contact carrier in relation to said guideway.

19. A vehicle switch arrangement for controlling delivery of electrical power to a plurality of vehicle lighting systems, the vehicle switch arrangement comprising:

a first circuit contact system having a plurality of selectable control states for controlling delivery of electrical energy to corresponding ones of predetermined combinations of first and second vehicle lighting systems;

a second circuit contact system having first and second selectable control states for controlling delivery of electrical energy to a specialized vehicle lighting system;

a switch control arrangement coupled to said first and second circuit contact systems for selecting the control states of said first and second circuit contact systems, said first circuit contact system being urged in a first direction of travel into the selectable control states, and said second circuit contact system being urged in a second direction of travel into the corresponding first and second selectable control states;

a manipulable portion coupled to said switch control arrangement for facilitating manipulation of said switch control arrangement by an operator;

a control state limiter arrangement for limiting said second circuit contact system to the first control state when said first circuit contact system is in a predetermined one of the plurality of corresponding selectable control states;

a first illuminated indicator system for illuminating visual indication. of the selectable control states of said first circuit contact system; and a translucent light guide disposed intermediate of said manipulable portion and said switch control arrangement for propagating therethrough a light issued by said first illuminated indicator system.

20. The vehicle switch arrangement of claim 19, wherein there is further provided a second illuminated indicator system for providing visual indication of the selectable control states of said second circuit contact system.

21. The vehicle switch arrangement of claim 20, wherein said second illuminated indicator system issues a light that is propagated through said translucent light guide.

22. The vehicle switch arrangement of claim 19, wherein said first and second directions of travel are orthogonal to one another.

23. The vehicle switch arrangement of claim 19, wherein there is further provided a guideway for limiting displacement of said second circuit contact system to a predetermined axial path.

24. The vehicle switch arrangement of claim 23, wherein there is further provided an axial retainer for maintaining said contact carrier within said guideway.

* * * * *

UNITED STATES PATENT AND TRADEMARK OFFICE
CERTIFICATE OF CORRECTION

PATENT NO.    : 6,515,240 B1
DATED         : February 4, 2003
INVENTOR(S)   : Arul S. Krishna and Shinichi Hikita It is certified that error appears in the above-identified patent and that said Letters Patent is hereby corrected as shown below:

<u>Column 3,</u>
Between lines 49-50, insert (paragraph):
 -- In one embodiment of this further aspect of the invention, there is provided a resilient biasing element arranged within the guideway for urging the contact carrier axially within the guideway. An axial retainer prevents the contact carrier from being expelled from the guideway in response to the resilient biasing element. As previously noted, the axial retainer is provided with a carrier stop formed of a stop protuberance that extends laterally outward from a determined one of the contact carrier and the guideway, and a stop recess that extends laterally inward into the other of the determined one of the contact carrier and the guideway. The first electrical contact exerts a resilient biasing force against the guideway in a direction that urges the stop protuberance and the stop recess into engagement. Additionally, a contact resilient element is interposed between the contact carrier and the first electrical contact element for exerting the resilient biasing force against the guideway. --; and
Lines 56-61, delete in their entirety.

Signed and Sealed this

Ninth Day of September, 2003

JAMES E. ROGAN
*Director of the United States Patent and Trademark Office*